Patented June 30, 1936

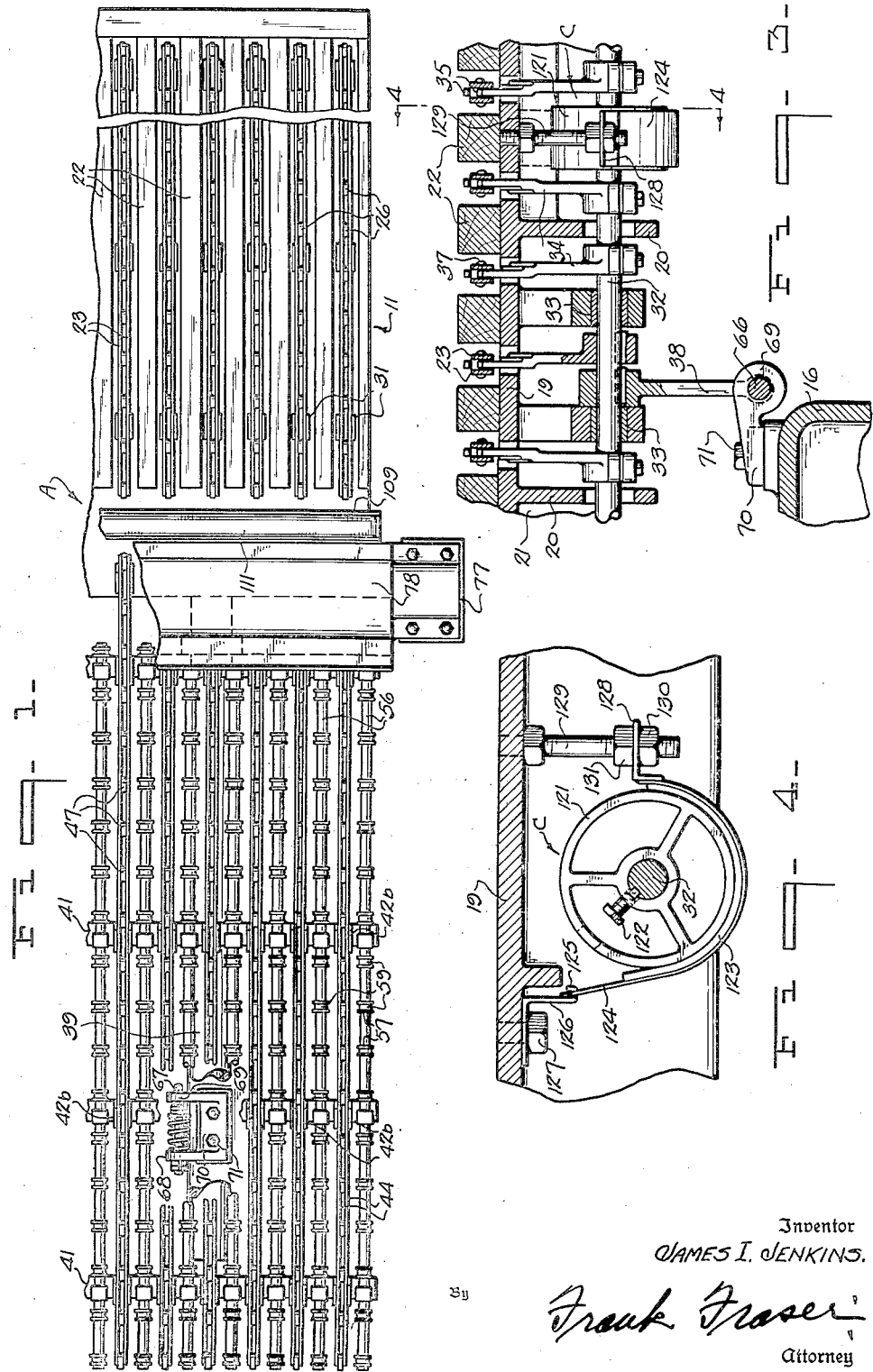

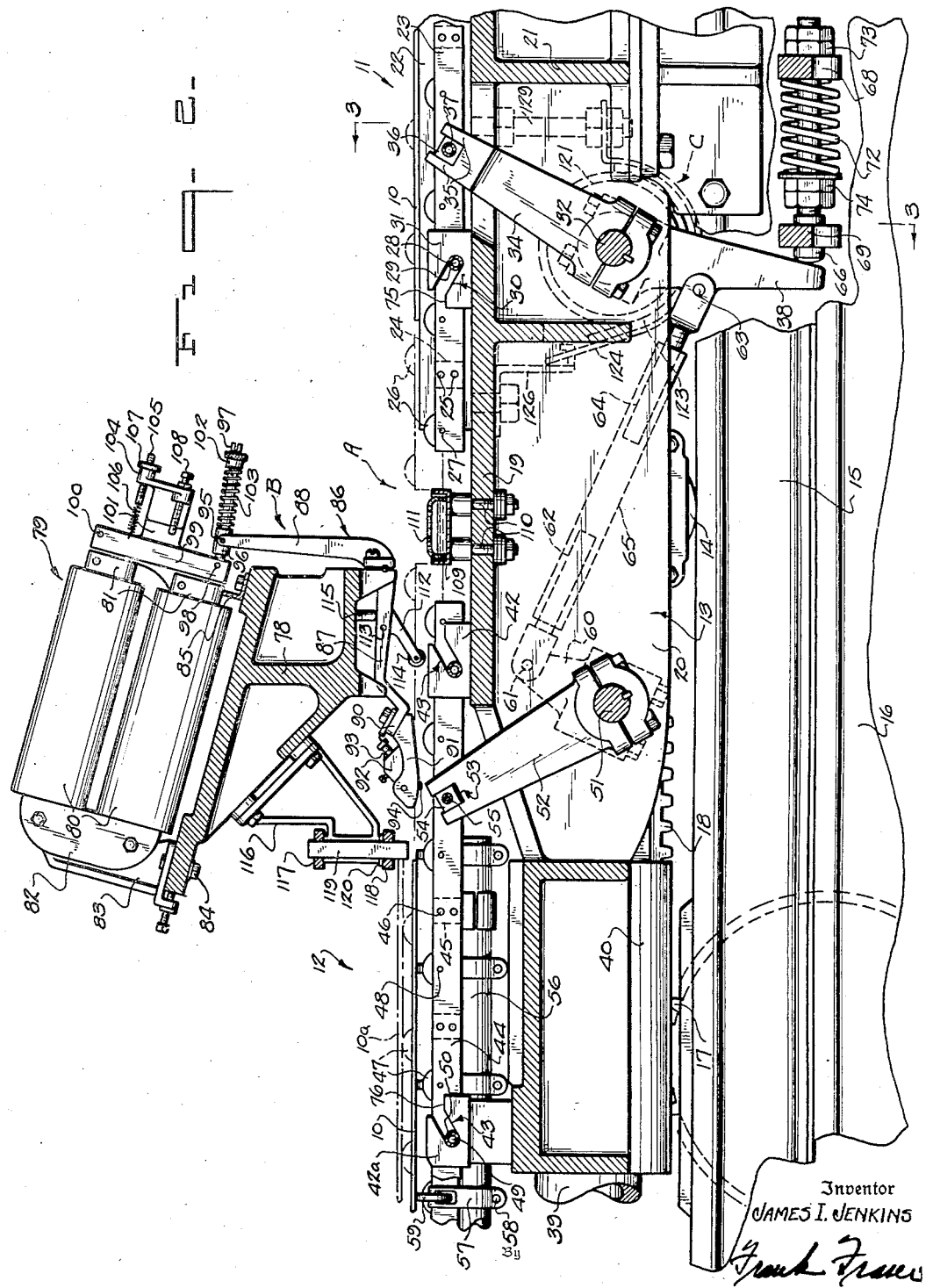

2,046,076

UNITED STATES PATENT OFFICE 2,046,076

CUTTING MACHINE

James I. Jenkins, Charleston, W. Va., assignor to Libbey-Owens-Ford Glass Company, Toledo, Ohio, a corporation of Ohio Application April 11, 1935, Serial No. 15,796

14 Claims. (Cl. 33—32)

The present invention relates broadly to cutting apparatus and more particularly to improvements in a machine designed especially for use in the cutting of glass sheets or plates but which may also be used for cutting other sheet material.

In the patent to E. A. Rosin No. 1,970,919, issued August 21, 1934, there is disclosed in detail a machine for cutting glass sheets or plates into a plurality of smaller sizes, as required, to obtain true edges, effect the elimination of defects, or both. This machine was designed to do away with the operation of hand cutting and to effect either a single cutting operation or a plurality of cutting operations simultaneously whereby the time required for cutting up a sheet of glass is materially reduced and the effort on the part of the operator correspondingly lessened. Briefly stated, the machine of the patent embodies a horizontal reciprocating cutting table for supporting the glass sheets to be cut and a cutting mechanism mounted thereabove, said cutting mechanism being stationary and the table being movable back and forth therebeneath.

In the copending application of E. A. Rosin, filed November 23, 1932, Serial No. 644,025, now Patent No. 1,998,968, issued April 23, 1935, there is disclosed an improved form of cutting table for use with the type of cutting machine disclosed in the above-mentioned patent, and this invention constitutes an improvement upon or addition to the cutting table disclosed in said copending application. This table, which is mounted to reciprocate beneath the cutting mechanism, comprises a cutting section for initially receiving the glass sheet to be cut and a receiving section for receiving the glass after it has been cut. A series of vertically movable rollers are carried by the cutting section of the table and are normally located under the sheet to be cut, while a second series of vertically movable rollers are carried by the receiving section and are located in the same plane as the first series of rollers. During the rearward movement of the table, the glass sheet is cut in the desired manner by the cutting mechanism arranged thereabove and after the cutting has been completed, the first and second series of rollers are simultaneously raised, thereby raising the sheet from the top of the table and supporting the same on the rollers of the cutting section. As the table then moves forwardly, the glass sheet is transferred from the rollers of the cutting section onto the rollers of the receiving section, and when the table reaches the end of its forward movement, the first and second series of rollers are simultaneously lowered.

A plurality of additional stationary rollers are also carried by the receiving section of the table, being preferably mounted to rotate about axes extending at substantially right angles relative to the axes about which the second series of rollers above mentioned rotate. Upon lowering of the vertically movable rollers carried by the receiving section of the table, the glass sheet will be transferred from said vertically movable rollers onto said stationary rollers, whereupon the glass can be moved laterally of the machine. When the vertically movable rollers of the receiving section of the table are in lowered position, they are disposed slightly beneath the stationary rollers.

With the above table construction, however, it has been found that upon lowering of the vertically movable rollers of the receiving section to bring the glass sheet to rest upon the stationary rollers, there is sometimes a tendency for the glass to be broken due to the force of the impact with which the sheet engages the stationary rollers. When the means holding the rollers in elevated position is released, the said rollers drop suddenly to lowered position, resulting in considerable jar and shock to the glass as well as to various parts of the machine.

An important object of this invention is the provision of means for retarding the lowering movement of the vertically movable rollers carried by the receiving section of the table, causing them to drop or fall more slowly and with considerably less jar and shock, thereby eliminating or reducing to a minimum breakage of the glass from this cause as well as lessening the strain upon the machine.

Another object of the invention is the provision of means of the above character including a friction brake device carried by and movable with the table and associated with the means for raising and lowering the vertically movable rollers to apply a constant braking or retarding force to the downward movement of the rollers carried by the receiving section of the table, thereby causing the glass sheet to be laid more gently upon the stationary rollers upon lowering thereof.

Other objects and advantages of the invention will become more apparent during the course of the following description when taken in connection with the accompanying drawings.

In the drawings forming a part of this application and wherein like numerals are employed to designate like parts throughout the same, Fig. 1 is a plan view of approximately one-half of a cutting table with which the present invention is associated, Fig. 2 is a vertical longitudinal section through a portion thereof, Fig. 3 is a vertical sectional view taken substantially on line 3—3 of Fig. 2, and Fig. 4 is a vertical section taken substantially on line 4—4 of Fig. 3.

Referring now to the drawings, the cutting machine illustrated therein includes generally a vertically movable reciprocating cutting table A; cutting mechanism B mounted thereabove; and a friction brake device C adapted to retard the lowering movement of the table after the cutting of the glass has been completed. The cutting table A is adapted to support the sheets or plates of glass 10 to be cut and is movable back and forth beneath the cutting mechanism B which is mounted in a relatively fixed position thereabove.

The table A is divided longitudinally into two principal portions or sections 11 and 12 respectively, the former constituting the cutting section upon which the glass sheets 10 are supported during cutting and the latter serving as a receiving section for receiving the glass from the cutting section after the cutting thereof, as will be more fully hereinafter described.

The cutting section 11 of table A includes a main body portion or casting 13 substantially rectangular in plan and supported at each side thereof and also adjacent each end upon wheels 14 (Fig. 2) which are mounted to run along a horizontal rail 15 carried by the supporting or sub-structure 16. The table A may be reciprocated upon the rails 15 by means of a reversible drive pinion 17 meshing with a rack bar 18 carried by the underside of said table and driven in any convenient manner.

The main table casting 13 comprises a flat horizontal top member or plate 19 having formed integral with the underside thereof a plurality of longitudinally extending depending flanges 20 and a plurality of depending transverse flanges 21. Carried upon the top plate 19 of casting 13 are a plurality of longitudinally extending transversely spaced, preferably wooden beams 22. Positioned within the space between any two adjacent beams 22 is a pair of spaced longitudinally extending metal strips 23 secured together and at the same time held properly spaced from one another by a series of blocks 24 and rivets or other fastening elements 25. (Fig. 2.) Arranged between and carried by the strips 23 of each pair are a plurality of relatively small discs or rollers 26 mounted upon pins 27 (Fig. 2), and which rollers project upwardly above the upper edges of the said strips as shown.

Each pair of strips 23 is supported adjacent its opposite ends and also intermediate its ends, as desired, upon transverse pins 28 extending through the said strips and spacing blocks 24 and carrying at their outer ends freely rotatable rollers 29 received within the inclined slots 30 (Fig. 2) formed in the substantially U-shaped supporting members 31, said supporting members being secured to the casting 13 by bolts or other suitable fastening elements. It will be noted that the slots 30 in supporting members 31 incline upwardly toward the center of the table and also that they are open at their upper ends.

Positioned beneath the top 19 of casting 13 and extending transversely of the table is a horizontal rocker shaft 32 mounted within bearings 33 carried by said casting. Fixed upon the shaft 32 are a plurality of upwardly projecting substantially vertical arms 34, one being provided for each pair of metal strips 23 as best shown in Fig. 3. The upper end of each rocker arm 34 is bifurcated (Fig. 2) to provide the spaced parallel legs 35 which are adapted to straddle a rectangular and preferably square block 36 positioned between the respective strips 23 and freely mounted upon a transverse pin 37 carried by the said strips.

Also carried by the shaft 32 and depending therefrom adjacent each side of the table is an operating lever 38, and upon rocking movement of these levers to rotate the shaft 32, it will be readily apparent that the arms 34 will be swung through an arc to effect the simultaneous raising or lowering of the several pairs of strips 23 and the rollers 26 carried thereby, depending upon in which direction the said arms are swung. The strips 23 and rollers 26 are guided in their vertical movements by the rollers 29 operating in the inclined slots 30 of the substantially U-shaped supporting members 31. When the rollers 26 are in lowered position, they are disposed slightly beneath the upper surfaces of the wooden beams 22 and when in raised position project slightly thereabove.

The receiving section 12 of the cutting table A includes a horizontally disposed tubular supporting member 39 of relatively large diameter positioned adjacent each side of the table and extending longitudinally thereof. Each of these members 39 is secured at its inner end to the main table casting 13, being mounted within a hub 40. The members 39 adjacent opposite sides of the table are connected together at their opposite ends and also intermediate their ends, if desired, by a plurality of cross members 41.

Secured upon the top 19 of the table adjacent the rear end thereof are a plurality of substantially U-shaped supporting members 42 and a plurality of similar supporting members are also supported upon the main casting 13 as shown at 42a and likewise upon the cross beams 41 as indicated at 42b in Fig. 1. The supporting members 42, 42a and 42b are all arranged in horizontal alignment with one another and likewise in horizontal alignment with the supporting members 31 carried by the cutting section 11 of the table.

The supporting members 42, 42a and 42b are of substantially the same construction as the supporting members 31 described hereinabove, each being provided with aligned slots 43 in the opposite sides thereof, said slots also inclining upwardly toward the center of the cutting table and being open at their upper ends. Thus, it will be seen that the slots 43 in supporting members 42, 42a and 42b are oppositely inclined with respect to the slots 30 in supporting members 31.

Carried by the supporting members 42, 42a and 42b are a plurality of pairs of metal strips 44 similar to the strips 23 carried by supporting members 31 and being arranged in substantially alignment therewith. The strips 44 of each pair are maintained spaced from one another by the spacing blocks 45 (Fig. 2) being secured together by rivets 46 passing through the said strips and spacing blocks. Positioned between the strips 44 of each pair are a plurality of discs or rollers 47 freely rotatable upon pins 48. The upper portions of the rollers 47 project above the upper edges of the strips 44 and are arranged at the same horizontal level as rollers 26. Passing transversely through each pair of strips 44 are a plurality of pins 49 carrying outwardly of the said strips, rollers 50 which are received within the inclined slots 43 in said supporting members.

Carried by the main casting 13 of the cutting table and extending transversely thereof is a shaft 51 in substantial horizontal alignment and also parallel with shaft 32. Mounted upon shaft 51 are a plurality of substantially vertical arms 52, one being provided for each pair of strips 44 and having its upper end bifurcated to provide a recess 53 within which is loosely received a rectangular and preferably square block 54 positioned between the strips and freely mounted upon a transverse pin 55. Thus, it will be seen that upon rocking of the shaft 51, the arms 52 will be swung through an arc to effect the simultaneous raising or lowering of the several pairs of metal strips 44 and the rollers 47 carried thereby, depending upon in which direction the said arms are swung, the said strips and rollers being guided in their vertical movements by the rollers 50 operating in the inclined slots 43 of the U-shaped supporting members 42, 42a and 42b.

Also carried by the cross beams 41 and extending longitudinally of the table are a plurality of tubular supporting members 56, said members being positioned between adjacent pairs of strips 44 and arranged parallel therewith. Mounted upon each tubular member 56 are a plurality of spaced brackets 57 fitting around the tubular member and clamped thereto by screws or the like 58. Carried at the upper end of each bracket 57 is a freely rotatable disc or roller 59 and it will be noted that these rollers are so arranged that the axes of rotation thereof are disposed at substantially right angles with respect to the axes of rotation of rollers 47. In other words, the rollers 47 rotate about axes extending transversely of the cutting table while the rollers 59 rotate about axes extending longitudinally of said table. When the rollers 47 are in lowered position, they are disposed slightly beneath the level of the rollers 59, whereas when in raised or elevated position, the tops of the said rollers 47 project slightly above the tops of rollers 59.

According to the present invention, the rollers 26 carried by the cutting section 11 of table A, and the rollers 47 carried by the receiving section 12 thereof, are adapted to be operated simultaneously. That is to say, they are adapted to be raised and lowered in unison so that they remain at all times in alignment with one another whether in raised or lowered position. In order to effect this simultaneous operation, there is keyed to the shaft 51 adjacent each side of the table a lever 60, and pivoted to the outer end of each lever as at 61 is an eye screw 62. Also pivoted to each of the levers 38 as at 63 is an eye screw 64, said eye screws 62 and 64 being connected together by a sleeve 65 threaded thereupon whereby to provide for adjustment of the levers 38 and 60 with respect to one another. The threads on the eye screws 62 and 64 are so arranged that upon rotation of the sleeve 65, the said eye screws will both be moved either outwardly or inwardly with respect to the sleeve. From the above, it will be seen that upon actuation of the levers 38 to rock the shaft 32, such rocking movement will be transmitted to the shaft 51.

Positioned adjacent the front end of the machine, at each side thereof, is a stop member 66 (Fig. 2) against which the lower ends of levers 38 are adapted to abut upon forward movement of the table, while a similar stop member 67 (Fig. 1) is provided adjacent the rear end of the machine and at each side thereof and against which the said levers 38 are adapted to abut upon rearward movement of the table. Each stop member 66 and 67 consists of a horizontal bolt which is passed loosely through the opposed legs 68 and 69 of a substantially U-shaped bracket 70 secured by screws or other fastening elements 71 to the supporting structure 16. Encircling the bolt between legs 68 and 69 is a compression spring 72 which tends to urge the said bolt inwardly, such inward movement being limited by nuts 73 threaded upon the outer end of said bolt. The spring 72 bears at one end against the leg 68 and at its opposite end upon nuts 74 threaded upon the intermediate portion of the bolt. By proper adjustment of the nuts 74, the pressure of the spring 72 can be regulated, as desired, whereas the extent to which the bolt projects inwardly can be varied by adjustment of nuts 73. This latter adjustment is very important in order that the levers 38 will engage the stop bolts 66 and 67 at the proper instant or, in other words, when the said table reaches a predetermined position.

With such a construction and arrangement as above described, it will be readily apparent that as the cutting table A moves forwardly and the lower ends of levers 38 engage stop bolts 66 to rock the shaft 32 in a clockwise direction, the upper ends of the rocker arms 34 will be swung to the right which will move all of the metal strips 23 forwardly. When this is done, the rollers 29 will move into the lower ends of the slots 30 in supporting members 31 and thereby cause the glass supporting rollers 26 to be lowered beneath the upper surfaces of the wooden beams 22 as shown by the full lines in Fig. 2. Upon rocking of the levers 38 in this manner, the shaft 51 will be simultaneously rocked in a counterclockwise direction, with the result that the arms 52 will be swung to the left to move all of the strips 44 rearwardly, thereby causing the rollers 47 to move downwardly within the slots 43 in supporting members 42, 42a and 42b, with the result that the glass supporting rollers 47 will be located slightly beneath the tops of the rollers 59 as also indicated by full lines in Fig. 2. However, when the cutting table is moved rearwardly and the levers 38 engage stop bolts 67, the arms 34 will be swung in a counter-clockwise direction to raise the strips 23 and rollers 26, and simultaneously the arms 52 will be swung in a clockwise direction to raise the strips 44 and rollers 47.

When the rollers 26 and 47 are in raised position, they will assume the positions indicated by the broken lines in Fig. 2 and will project slightly above the wooden beams 22 and rollers 59 respectively. When the glass supporting rollers 26 and 47 are moved into elevated position, the rollers 29 will rest upon the flat upper edges 75 of the supporting members 31, while the rollers 50 will rest upon the flat upper edges 76 of the members 42, 42a and 42b. In this way, the glass supporting rollers 26 and 47 will be maintained in elevated position until lowered by the engagement of the levers 38 with the stop bolts 66 upon forward movement of the cutting table.

Although the present invention is not limited to any specific type of cutting mechanism, yet the cutting mechanism B is preferably the same or substantially the same as that disclosed in the above-mentioned patent and to which reference may be had for a more detailed disclosure thereof. Consequently, only those portions of the cutting mechanism which are necessary to a complete understanding of the present invention have been herein disclosed. Briefly stated, the cutting mechanism B embodies a vertical stationary standard 77 (Fig. 1) located at each side of the machine and having secured to the upper ends thereof a cross member or beam 78, said beam being arranged transversely above the table A and supporting a series of cutting units arranged side by side, one unit being illustrated in Fig. 2 and designated in its entirety by the numeral 79. The cutters are preferably, although not necessarily, spaced about one inch apart.

Each cutting unit 79 includes a pair of relatively thin electro-magnets 80 positioned one above the other and each consisting of a metal core 81 about which is wound the usual coil. The cores 81 for each pair of magnets form the customary horseshoe magnet by being integral with their connecting member 82 which is secured to a bracket 83 which is in turn secured to the cross member 78 by screws or other fastening elements 84. The forward ends of the said magnets are supported upon plates 85.

Each of the cutting units 79 also includes a substantially L-shaped lever 86 comprising a substantially horizontal tool supporting arm 87 and a substantially vertical arm 88, said lever being pivotally mounted intermediate its ends upon a horizontal pin 89 carried by the cross member 78. The horizontal portion 87 of the lever is provided with an offset foot 90 carrying a shoe 91 having an arcuately shaped bottom. Carried by the shoe is a cutter holder 92 carrying the cutter ferrule 93 to the lower end of which is secured the cutting diamond 94.

The upper end of the vertical arm 88 of each lever is bifurcated and has pivoted thereto as at 95 a sleeve 96. This sleeve is slidably mounted upon a split bolt 97 pivoted at its inner end as at 98 to a bar or armature 99 which in turn has a pivotal mounting at its upper end as at 100 with a bracket 101 fixedly carried by the cores 81 of the electro-magnets. Threaded upon the outer end of the split bolt 97 is a nut 102, and encircling the bolt and bearing at one end against the sleeve 96 and at its opposite end against the nut 102 is a compression spring 103 normally tending to urge the sleeve 96 and consequently the upper end of the lever arm 86 inwardly. The pin 95 of course passes loosely through the slot in the split bolt 97.

Loosely received through the portion 104 of bracket 101 is a screw 105 having secured to its inner end a tension spring 106, the opposite end of said spring being connected to the bar 99 and acting to normally draw the said bar away from and out of engagement with the cores of the electro-magnets. A nut 107 is threaded upon the outer end of screw 105 to adjust the tension of spring 106. Also carried by the bracket 101 is a stop screw 108 which serves to limit the outward movement of bar 99 about its pivot 100.

In practice, when the electro-magnets 80 are energized, the bar 99 will be drawn inwardly thereby against the action of spring 106, and of course the inward movement of bar 99 will cause the lever 86 to be rocked in a counter-clockwise direction upon pin 89 which will effect a lowering of the cutter diamond 94 into cutting position. However upon de-energization of the electro-magnets, the spring 106 will function to swing the bar 99 outwardly so as to rock the lever in a clockwise direction to raise the cutter diamond to a non-cutting position. The spring 103 serves to yieldably maintain the cutter in engagement with the glass during the cutting operation while at the same time allowing a rocking movement of the lever 86 to take care of any unevenness in the glass surface. In other words, the lever is permitted a rocking movement even when the bar 99 is held inwardly by the electro-magnets.

As pointed out above, the cutting units are preferably spaced approximately one inch apart throughout the width of the table and, as disclosed in the above identified patent, are preferably actuated by the operator through the medium of a keyboard positioned adjacent the front of the machine. The keyboard comprises a plurality of keys, one provided for and connected in circuit with the electro-magnets of the respective cutter so that the said cutters are independently movable at all times into and out of cutting position.

In order to facilitate the cutting operation and better the action of the cutting tools, it is desirable to oil the glass sheets or plates along the path to be travelled by said cutting tools. To this end, there is mounted upon the top of the table A between the adjacent ends of the pairs of strips 23 and 44 an oiling device comprising a reservoir 109 adapted to contain a quantity of oil and being suitably secured in place by studs or the like 110. The oiling device also includes an inverted substantially U-shaped wick 111 of suitable material such as felt or the like, the down-turned edges of said wick being immersed within the oil so that the oil will pass upwardly by capillary attraction into and through said wick.

Also carried by the L-shaped lever 86 of each cutting unit 79 is an arm 112 pivoted to said lever as at 113 and carrying at one end a roller or wheel 114 of felt or some other suitable material. This roller is adapted to rest upon the upper surface of the oiling wick 111 when the table is in its normal inoperative position and when the cutters are lowered into cutting position. One of these wheels is provided for and positioned in alignment with each cutting diamond so that as the table is moved rearwardly through its cutting stroke, the wheels are run over the glass in advance of the cutters and oil the same whereby to facilitate and better the cutting action of the diamonds. The downward movement of each oiling wheel is limited by a stop pin 115 carried by the cross beam 78. The pivot point 113 is so positioned with respect to wheel 114 that when the cutters are lowered into cutting position, the said wheels are adapted to rest upon wick 111, whereas when the cutters are raised into non-cutting position, the wheels 114 are also adapted to be swung upwardly out of contact with the oiling device.

After the cutting of the glass sheet has been completed and the cutters lifted therefrom, the glass is adapted to be shifted from the cutting section 11 of the table onto the receiving section 12 thereof. This is ordinarily accomplished in the following manner: Thus, there is secured to the cross beam 78 a plurality of spaced brackets 116 and carried by these brackets are the upper and lower horizontal metal bars 117 and 118, said bars extending transversely of the table and having vertically aligned openings therein through which are inserted the vertically disposed stops 119. The downward movement of these stops is limited by pins 120 engaging the lower bar 118. When the stop members are in their lowermost position, they project downwardly beneath the tops of the rollers 26 and 47 when the said rollers are in elevated position. However, since the stop members are positioned in line with the wooden beams 22, they in no way interfere with the reciprocating movement of the table nor with the raising and lowering of the rollers.

When the machine is in its normal inoperative position with the cutting table A at the forward end of its movement, as shown in Fig. 1, all of the cutting diamonds are preferably maintained in elevated non-cutting position due to the fact that at this time the magnets 80 are de-energized. Also, at such time the levers 38 are in engagement with stop bolts 66 so that the rollers 26 of the cutting section of the table are disposed slightly beneath the upper surfaces of the wooden beams 22, while the rollers 47 of the receiving section are disposed slightly beneath the tops of rollers 59.

The operator then places the glass sheet 10 to be cut upon the cutting section of the table where it is supported by the wooden beams 22. After inspecting the glass, the operator causes the energization of the desired magnets 80 to cause movement of the corresponding cutters into cutting position. The means for then moving the table is placed in operation and the table moved rearwardly beneath the cutting mechanism, whereupon those cutters which have been previously moved into cutting position will effect the scoring of the glass along the desired lines.

When the cutting table reaches the end of its rearward cutting stroke, the levers 38 engaging stop bolts 66 will effect the raising of the rollers 26, whereupon the sheet will be lifted up off of the wooden beams 22 and supported by said rollers. Simultaneously, the rollers 47 will be raised so that they project slightly above the rollers 59. As the table then moves forwardly, the forward edge of the glass sheet will abut the stops 119 and, upon continued forward movement of the table, the sheet will be transferred from the rollers 26 onto the rollers 47 as indicated at 10a in Fig. 2. During the return travel of the table, the supporting rollers 26 are held in elevated position by the rollers 29 resting upon the flat upper edges 75 of the supporting members 31 while the supporting rollers 47 are maintained in elevated position by the rollers 50 resting upon the flat upper edges 76 of members 42, 42a and 42b. When the table reaches the end of its forward or return stroke, the levers 38 engaging stop bolts 67 will cause a simultaneous lowering of the rollers 26 and 47, and it will be seen that upon lowering of the said rollers 47, the glass sheet will be transferred therefrom onto the rollers 59. The sheet can then be removed laterally from the cutting table. It will of course be understood that just prior to the raising of the rollers 26 and 47, the electromagnets 80 will be de-energized to cause those cutters in cutting position to be moved upwardly out of cutting position.

As brought out above, when the rollers 47 of the receiving section of the table are lowered to bring the glass sheet 10a to rest upon the stationary rollers 59, the sheet is sometimes broken due to the suddenness with which the rollers drop and the abruptness with which the glass engages the said stationary rollers. Also, that this invention contemplates the elimination of this breakage by applying a constant retarding or braking force to the downward movement of the rollers 47, thereby causing the glass to be laid more gently upon the rollers 59. For the accomplishment of this purpose, there is provided the friction brake device C carried upon the underside of the table and movable therewith, said friction brake including a drum 121 mounted upon the shaft 32 and fixed thereto by a set screw or the like 122.

Adapted to engage the drum 121 is a brake shoe 123 carried by a flexible brake band 124, said band being fastened at one end to a hook 125 formed at the lower end of an angle bracket 126 secured to the underside of the table 19 by a screw or the like 127, while attached to the opposite end of the brake band is an angle plate 128 having an opening therein for loosely receiving therethrough a vertical bolt 129 also carried upon the underside of the table. The angle plate 128 is clamped upon the bolt between nuts 130 and 131, and upon proper adjustment of these nuts the frictional contact between the brake shoe 123 and drum 121 may be varied as desired.

With this construction, it will be readily apparent that the friction brake device C will have a constant retarding or braking action upon the rotation of shaft 32 and consequently upon the raising and lowering of the rollers 26 and 47 carried by the cutting and receiving sections 11 and 12 respectively of the table. While the friction brake device will function to retard both the raising and lowering of the two series of rollers 26 and 47, yet it has been provided primarily for retarding the downward movement of the rollers 47 in order to prevent these rollers from dropping too suddenly upon engagement of the levers 38 with the stop bolts 67, thereby greatly reducing the force of the impact with which the sheet engages the stationary rollers 59 and in consequence minimizing the danger of the glass being broken.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass cutting apparatus of the character described, a table including a series of vertically movable rollers for supporting the glass sheet subsequent to cutting, means for raising said rollers into elevated position to receive the sheet thereon, means for subsequently lowering said rollers and sheet carried thereby, a plurality of additional rollers carried by the table for receiving the sheet from the first series of rollers upon lowering of the latter, and a friction brake device for retarding the downward movement of said first series of rollers.

2. In sheet glass cutting apparatus of the character described, a table including a series of vertically movable, freely rotatable rollers for supporting the glass sheet subsequent to cutting, means for raising said rollers into elevated position to receive the glass sheet thereon, means for subsequently lowering said rollers and sheet carried thereby, a plurality of additional stationary rollers carried by the table for receiving the sheet from the first series of rollers upon lowering of the latter, said additional rollers being rotatable in a direction at substantially right angles to the first series of rollers, and a friction brake device associated with said lowering means for retarding the downward movement of said first series of rollers.

3. In sheet glass cutting apparatus of the character described, a reciprocating table for supporting the sheet to be cut including a cutting section and a receiving section, means for reciprocating said table, said sheet to be cut being initially received upon the cutting section, means for cutting the sheet during rearward movement of the table, a series of vertically movable rollers carried by the receiving section, means for raising said rollers when the table reaches the end of its rearward cutting movement, said sheet being transferred from the cutting section to the rollers of the receiving section upon forward movement of the table, means for lowering said rollers after the sheet has been transferred from the cutting section onto the receiving section, a plurality of additional rollers carried by the receiving section of the table for receiving the sheet from the first series of rollers upon lowering of the latter, and means for retarding the downward movement of said first series of rollers.

4. In sheet glass cutting apparatus of the character described, a reciprocating table for supporting the sheet to be cut including a cutting section and a receiving section, means for reciprocating said table, said sheet to be cut being initially received upon the cutting section, means for cutting the sheet during rearward movement of the table, a series of vertically movable rollers carried by the receiving section, means for raising said rollers when the table reaches the end of its rearward cutting movement, said sheet being transferred from the cutting section to the rollers of the receiving section upon forward movement of the table, means for lowering said rollers after the sheet has been transferred from the cutting section onto the receiving section, a plurality of additional rollers carried by the receiving section of the table for receiving the sheet from the first series of rollers upon lowering of the latter, and a friction brake device for retarding the downward movement of said first series of rollers.

5. In sheet glass cutting apparatus of the character described, a reciprocating table for supporting the sheet to be cut including a cutting section and a receiving section, means for reciprocating said table, said sheet to be cut being initially received upon the cutting section, means for cutting the sheet during rearward movement of the table, a series of vertically movable, freely rotatable rollers carried by the receiving section, means for raising said rollers when the table reaches the end of its rearward cutting movement, said sheet being transferred from the cutting section to the rollers of the receiving section upon forward movement of the table, means for lowering said rollers after the sheet has been transferred from the cutting section onto the receiving section, a plurality of additional stationary rollers carried by the receiving section of the table for receiving the sheet from the first series of rollers upon lowering of the latter, said additional rollers being rotatable in a direction at substantially right angles to the first series of rollers, and means carried by and movable with the table for retarding the downward movement of said first series of rollers.

6. In sheet glass cutting apparatus of the character described, a reciprocating table for supporting the sheet to be cut including a cutting section and a receiving section, means for reciprocating said table, said sheet to be cut being initially received upon the cutting section, means for cutting the sheet during rearward movement of the table, a series of vertically movable, freely rotatable rollers carried by the receiving section, means for raising said rollers when the table reaches the end of its rearward cutting movement, said sheet being transferred from the cutting section to the rollers of the receiving section upon forward movement of the table, means for lowering said rollers after the sheet has been transferred from the cutting section onto the receiving section, a plurality of additional stationary rollers carried by the receiving section of the table for receiving the sheet from the first series of rollers upon lowering of the latter, said additional rollers being rotatable in a direction at substantially right angles to the first series of rollers, and a friction brake device carried by and movable with the table for retarding the downward movement of said first series of rollers.

7. In sheet glass cutting apparatus of the character described, a reciprocating table for supporting the sheet to be cut including a cutting section and a receiving section, means for reciprocating said table, a series of vertically movable rollers carried by said cutting section, said series of rollers being located under the sheet to be cut at the forward end of the table movement, a series of vertically movable rollers carried by said receiving section, said series of rollers being located in the same plane as the previous series of rollers, means for cutting the sheet during the rearward movement of the table, means for simultaneously raising the first and second series of rollers after the cutting has been completed, thereby raising the sheet from the top of the table and supporting said sheet on the rollers of the cutting section, said sheet being transferred from the rollers of the cutting section of the table onto the rollers of the receiving section thereof during forward movement of said table, means for simultaneously lowering said first and second series of rollers after the glass has been transferred from the cutting section onto the receiving section, a plurality of additional rollers carried by the receiving section of the table for receiving the glass from said second series of rollers upon lowering of the latter, and means for retarding the downward movement of said first and second series of rollers.

8. In sheet glass cutting apparatus of the character described, a reciprocating table for supporting the sheet to be cut including a cutting section and a receiving section, means for reciprocating said table, a series of vertically movable rollers carried by said cutting section, said series of rollers being located under the sheet to be cut at the forward end of the table movement, a series of vertically movable rollers carried by said receiving section, said series of rollers being located in the same plane as the previous series of rollers, means for cutting the sheet during the rearward movement of the table, means for simultaneously raising the first and second series of rollers after the cutting has been completed, thereby raising the sheet from the top of the table and supporting said sheet on the rollers of the cutting section, said sheet being transferred from the rollers of the cutting section of the table onto the rollers of the receiving section thereof during forward movement of said table, means for simultaneously lowering said first and second series of rollers after the glass has been transferred from the cutting section onto the receiving section, a plurality of additional rollers carried by the receiving section of the table for receiving the glass from said second series of rollers upon lowering of the latter, and a friction brake device for retarding the downward movement of said first and second series of rollers.

9. In sheet glass cutting apparatus of the character described, a reciprocating table for supporting the sheet to be cut including a cutting section and a receiving section, means for reciprocating said table, a series of vertically movable rollers carried by said cutting section, said series of rollers being located under the sheet to be cut at the forward end of the table movement, a series of vertically movable rollers carried by said receiving section, said series of rollers being located in the same plane as the previous series of rollers, means for cutting the sheet during the rearward movement of the table, means for simultaneously raising the first and second series of rollers when the table reaches the end of its rearward cutting movement, thereby raising the sheet from the top of the table and supporting said sheet on the rollers of the cutting section, means for effecting the transfer of the glass from the rollers of the cutting section of the table onto the rollers of the receiving section thereof during forward movement of said table, means for maintaining both series of rollers in elevated position as the table moves forwardly, means for smultaneously lowering the first and second series of rollers when the table reaches the end of its return movement, a plurality of additional rollers carried by the receiving section of the table for receiving the glass thereupon from the second series of rollers upon lowering of the latter, and means for retarding the downward movement of said first and second series of rollers.

10. In sheet glass cutting apparatus of the character described, a reciprocating table for supporting the sheet to be cut including a cutting section and a receiving section, means for reciprocating said table, a series of vertically movable rollers carried by said cutting section, said series of rollers being located under the sheet to be cut at the forward end of the table movement, a series of vertically movable rollers carried by said receiving section, said series of rollers being located in the same plane as the previous series of rollers, means for cutting the sheet during the rearward movement of the table, means for simultaneously raising the first and second series of rollers when the table reaches the end of its rearward cutting movement, thereby raising the sheet from the top of the table and supporting said sheet on the rollers of the cutting section, means for effecting the transfer of the glass from the rollers of the cutting section of the table onto the rollers of the receiving section thereof during forward movement of said table, means for maintaining both series of rollers in elevated position as the table moves forwardly, means for smultaneously lowering the first and second series of rollers when the table reaches the end of its return movement, a plurality of additional rollers carried by the receiving section of the table for receiving the glass thereupon from the second series of rollers upon lowering of the latter, and a friction brake device for retarding the downward movement of said first and second series of rollers.

11. In sheet glass cutting apparatus of the character described, a reciprocating table for supporting the sheet to be cut including a cutting section and a receiving section, means for reciprocating said table, a series of vertically movable rollers carried by said cutting section, said series of rollers being located under the sheet to be cut at the forward end of the table movement, a series of vertically movable rollers carried by said receiving section, said series of rollers being located in the same plane as the previous series of rollers, means for cutting the sheet during the rearward movement of the table, means for simultaneously raising the first and second series of rollers when the table reaches the end of its rearward cutting movement, thereby raising the sheet from the top of the table and supporting said sheet on the rollers of the cutting section, means for effecting the transfer of the glass from the rollers of the cutting section of the table onto the rollers of the receiving section thereof during forward movement of said table, means for maintaining both series of rollers in elevated position as the table moves forwardly, means for smultaneously lowering the first and second series of rollers when the table reaches the end of its return movement, a plurality of additional rollers carried by the receiving section of the table for receiving the glass thereupon from the second series of rollers upon lowering of the latter, said additional rollers being rotatable in a direction at substantially right angles to the rollers of the first and second series, and means carried by and movable with the table for retarding the downward movement of said first and second series of rollers.

12. In sheet glass cutting apparatus of the character described, a reciprocating table for supporting the sheet to be cut including a cutting section and a receiving section, means for reciprocating said table, a series of vertically movable rollers carried by said cutting section, said series of rollers being located under the sheet to be cut at the forward end of the table movement, a series of vertically movable rollers carried by said receiving section, said series of rollers being located in the same plane as the previous series of rollers, means for cutting the sheet during the rearward movement of the table, means for simultaneously raising the first and second series of rollers when the table reaches the end of its rearward cutting movement, thereby raising the sheet from the top of the table and supporting said sheet on the rollers of the cutting section, means for effecting the transfer of the glass from the rollers of the cutting section of the table onto the rollers of the receiving section thereof during forward movement of said table, means for maintaining both series of rollers in elevated position as the table moves forwardly, means for smultaneously lowering the first and second series of rollers when the table reaches the end of its return movement, a plurality of additional rollers carried by the receiving section of the table for receiving the glass thereupon from the second series of rollers upon lowering of the latter, said additional rollers being rotatable in a direction at substantially right angles to the rollers of the first and second series, and a friction brake device associated with the lowering means for retarding the downward movement of said first and second series of rollers.

13. In sheet glass cutting apparatus of the character described, a reciprocating table for supporting the sheet to be cut including a cutting section and a receiving section, means for reciprocating said table, a series of vertically movable rollers carried by said cutting section, said series of rollers being located under the sheet to be cut at the forward end of the table movement, a series of vertically movable rollers carried by said receiving section, said series of rollers being located in the same plane as the previous series of rollers, means for cutting the sheet during the rearward movement of the table, means for simultaneously raising and lowering the first and second series of rollers including a lever, a shaft upon which said lever is mounted, and operative connections between said lever and rollers, means for actuating said lever to simultaneously raise the two series of rollers after the cutting has been completed thereby raising the sheet from the top of the table and supporting said sheet on the rollers of the cutting section, means for effecting the transfer of the glass from the rollers of the cutting section of the table onto the rollers of the receiving section thereof during forward movement of said table, means for actuating said lever to effect the simultaneous lowering of said first and second series of rollers after the glass has been transferred from said cutting section onto said receiving section, a plurality of additional rollers carried by the receiving section of the table for receivng the glass thereupon from the second series of rollers upon lowering of the latter, and means for retarding the downward movement of said first and second series of rollers including a brake drum keyed to said shaft, and a brake shoe carried by the table and engaging said brake drum.

14. In sheet glass cutting apparatus of the character described, a reciprocating table for supporting the sheet to be cut including a cutting section and a receiving section, means for reciprocating said table, a series of vertically movable rollers carried by said cutting section, said series of rollers being located under the sheet to be cut at the forward end of the table movement, a series of vertically movable rollers carried by said receiving section, said series of rollers being located in the same plane as the previous series of rollers, means for cutting the sheet during the rearward movement of the table, means for simultaneously raising and lowering the first and second series of rollers including a lever, a shaft upon which said lever is mounted, and operative connections between said lever and rollers, means for actuating said lever to simultaneously raise the two series of rollers after the cutting has been completed thereby raising the sheet from the top of the table and supporting said sheet on the rollers of the cutting section, means for effecting the transfer of the glass from the rollers of the cutting section of the table onto the rollers of the receiving section thereof during forward movement of said table, means for actuating said lever to effect the simultaneous lowering of said first and second series of rollers after the glass has been transferred from said cutting section onto said receiving section, a plurality of additional rollers carried by the receiving section of the table for receiving the glass thereupon from the second series of rollers upon lowering of the latter, said additional rollers being rotatable in a direction at substantially right angles to the rollers of the first and second series, and a friction brake device associated with said shaft for retarding the rotation thereof.

JAMES I. JENKINS.